United States Patent [19]

Skates

[11] 4,059,292
[45] Nov. 22, 1977

[54] EXPANSIBLE COUPLING

[76] Inventor: Raymond E. Skates, 1612 Grand Ave., Kansas City, Mo. 64106

[21] Appl. No.: 704,189

[22] Filed: July 12, 1976

[51] Int. Cl.² ............................................. F16L 51/02
[52] U.S. Cl. ...................................... 285/229; 285/236
[58] Field of Search ............... 285/229, 226, 235, 369, 285/237, 109, 253, 252, 236

[56] References Cited

U.S. PATENT DOCUMENTS

| | | | |
|---|---|---|---|
| 3,107,931 | 10/1963 | Killian | 285/229 X |
| 3,164,401 | 1/1965 | Fawkes | 285/229 |
| 3,211,475 | 10/1965 | Freed et al. | 285/229 |
| 3,432,189 | 3/1969 | Buller | 285/369 X |
| 3,460,856 | 8/1969 | Van Tine et al. | 285/236 X |
| 3,647,247 | 3/1972 | Pintard et al. | 285/229 |
| 3,811,714 | 5/1974 | Pintard | 285/229 |

FOREIGN PATENT DOCUMENTS 2,092,992   1/1972   France ............................ 285/229

*Primary Examiner*—Thomas F. Callaghan
*Attorney, Agent, or Firm*—Fishburn, Gold & Litman

[57] ABSTRACT

An expansible coupling for sealingly joining the ends of a pair of fluid flow passages or ducts such as exhaust gas ducts, includes an inverted V-shaped rim attached to each duct adjacent to its open end. A pair of elongate, segmented clamping members having a longitudinal, V-shaped channel therein cooperatively mate with the rim, and a flexible non-metallic seal member has the marginal edge portions thereof retained between the rim and the clamping member. A plurality of adjustable fasteners having pivotal arms for quick release are positioned regularly about each duct end and urge the rim and clamping members together to form an airtight and flexible joint between the two duct ends.

9 Claims, 3 Drawing Figures

EXPANSIBLE COUPLING

This invention relates to expansion joints and in particular to expansible couplings for ducts such as in air quality control systems wherein boiler exhaust gases are directed through sophisticated scrubbers prior to exhausting the same through a stack and into the atmosphere.

In duct work systems there is a need to compensate for the thermal expansion and contraction of the duct material, as well as the axial misalignment of the various duct sections. Expansible couplings, having a flexible, fluid impermeable material, are therefore dispersed appropriately throughout the duct system. For very large size duct work, such as that used in air quality control systems for power plants, the ducts often have a peripheral dimension in the nature of 50 feet and more. In such systems it is not only difficult to securely seal such a large opening, but inasmuch as the flexible material must be periodically replaced, the expansible couplings need to be capable of easy disassembly to minimize the system's down time and to reduce maintenance costs.

The principal objects of the present invention are: to provide an expansible coupling having mating seating surfaces such as V-shaped cooperating members, which securely and positively seal the various duct segments; to provide such a coupling wherein the cooperating V-shaped members are urged together by a plurality of fastening devices having pivotally mounted arms for the quick and easy replacement of the flexible seal; to provide such a coupling wherein each fastening device is slidably attached to the duct by a channel-shaped way for improved maintenance efficiency and seal integrity; to provide such a coupling wherein the V-shaped clamping members are positioned along a terminal end edge of each duct whereby the flexible seal member, in a relaxed state, assumes a substantially parabolic or catenary configuration for improved fatigue resistance and durability; and to provide such a coupling which is economical to manufacture, efficient in use, capable of a long operating life, and particularly well adapted for the proposed use.

Other objects and advantages of this invention will become apparent from the following description taken in connection with the accompanying drawings, wherein are set forth, by way of illustration and example, certain embodiments of this invention.

The drawings constitute a part of the specification and include exemplary embodiments of the present invention and illustrate various objects and features thereof.

Figure 2:
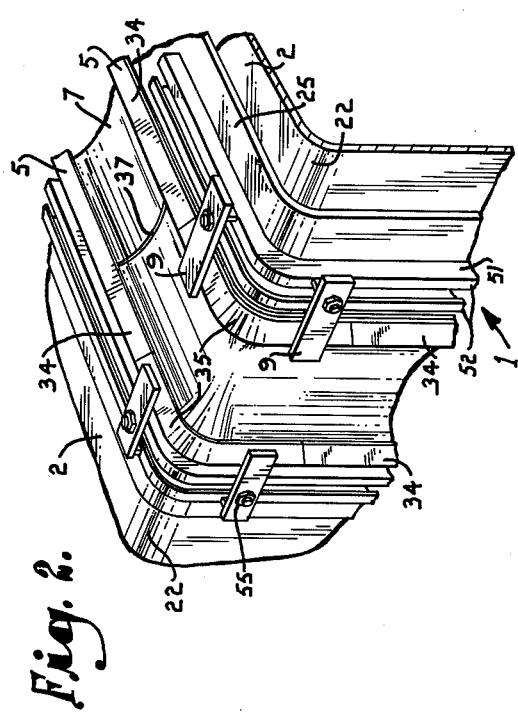
FIG. 2 is a fragmentary perspective view of an expansible coupling attached to adjacent duct segments.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates an expansible coupling for joining the ends of adjacent duct work segments 2. The coupling 1 comprises a rim 3 having a protruding surface, such as an inverted V-shaped, attached to and extending around each duct adjacent the open end 4 thereof, and a pair of elongate, segmented clamping members 5 having a longitudinal channel 6 therein which cooperatively mates with the rim 3. A flexible, non-metallic seal member 7 has marginal edge portions 8 thereof retained between the rim 3 and clamping members 5, and a plurality of adjustable fasteners 9 are positioned regularly about each duct end 4 and urge the rim and clamping members together to form an airtight and flexible joint.

Figure 1:
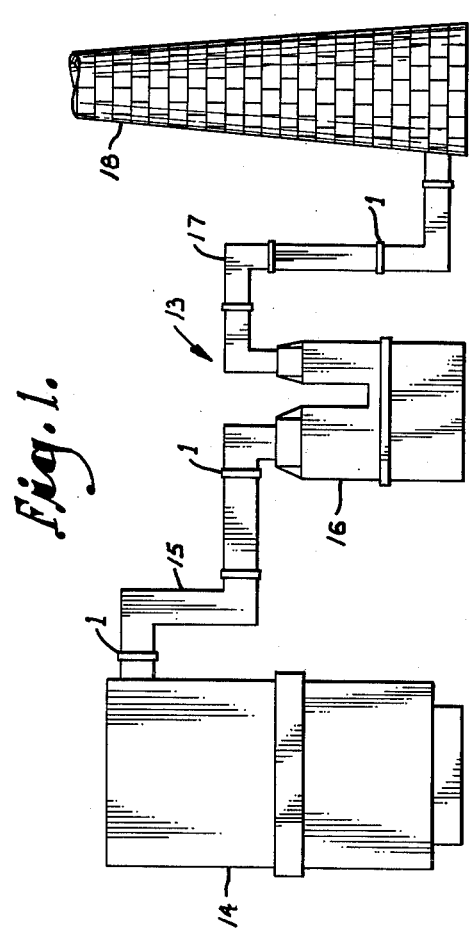
FIG. 1 is a diagrammatic illustration of an exhaust gas scrubbing system employing expansible couplings embodying the present invention.
Figure 3:
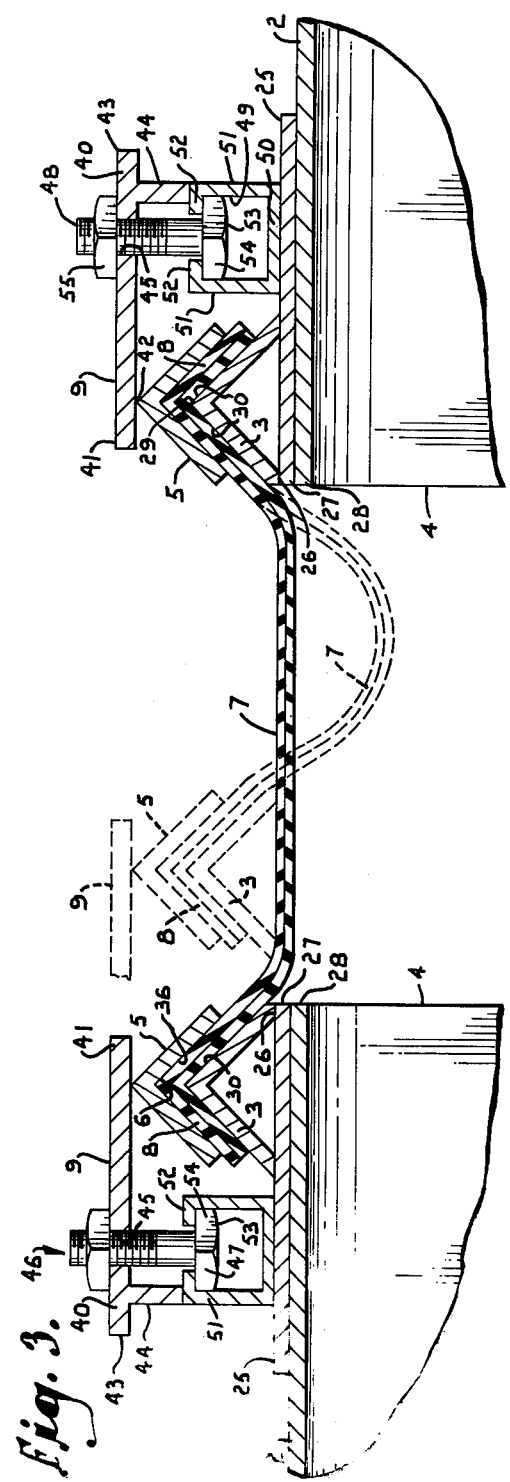
FIG. 3 is a fragmentary, vertical cross-sectional view of the flexible coupling and adjacent duct segments in an expanded state, and wherein phantom lines indicate a relaxed state.

The illustrated expansible coupling 1 is particularly adapted for use in air quality control systems for power plants such as that diagramatically illustrated in FIG. 1 and generally designated by the reference numeral 13. The boiler 14, wherein water is heated into steam, directs the exhaust gases of combustion therefrom into a duct work system 15 comprised of a plurality of interconnected duct segments, and conveys the gases to a scrubber 16 wherein particles and noxious gases are removed therefrom. The clean gases are then directed through a second duct work system 17 to a stack 18 and expelled therefrom into the atmosphere. Each of the duct work systems 15 and 17 include intermittently dispersed expansible couplings 1 to accomodate for the expansion and contraction of the duct work as the material therein reacts to temperature changes induced by various plant operating conditions.

The duct segments 2 are elongate, tube-like structures for conveying fluids such as exhaust gases therethrough, and are conventionally constructed of a metallic material, such as sheet steel. The ducts have a lateral, cross-sectional shape which, at least at the end portions 4 thereof, is preferably free of sharp corners, such as circular, oval, and the like. In the illustrated structure, the duct segments 2 have a rectangular shape with the corners 22 thereof rounded on a radius in the nature of 10 inches.

The rim 3 is an elongate structure having an inverted V-shaped outer surface and is fastened to and projecting from each duct end 4. In the illustrated example, a substantially flat band member 25 is fastened about the duct end 4 by means such as welding or the like, to facilitate coupling manufacture, and the rim 3 is in turn attached to the upper surface of the band 25. The rim 3 is illustrated as being constructed of angle material such as steel or iron, and having a shape substantially similar to an isosceles right triangle wherein an inner base edge 26 thereof is positioned coextensively with the terminal end edges 27 and 28 respectively of the band 25 and duct 2. The uppermost edge 29 of the rim 3 is preferably slightly rounded to avoid cutting the flexible seal member 7, and the inclined surfaces 30 thereof are preferably smooth.

Each of the elongate clamping members 5 have a V-shaped channel 6 disposed longitudinally therein which cooperatively mates with one of the projecting rims 3. In this example, the clamping member 5 is divided into separate straight and curved segments 34 and 35 respectively, which are positioned in an end-to-end fashion. In this manner, the clamping member 5 need not be distorted or bent to disengage the same from its associated rim member 3. Further, the segmented clamping member design facilitates the manufacture of the coupling, and reduces flexible seal replacement time. The interior surfaces 36 of each clamping member 5 mate with the inclined rim surfaces 30 and are preferably smooth. In the illustrated structure, the clamping members are constructed of a V-shaped angle material for reduced cost and weight, and for improved rigidity and strength.

The flexible seal member 7 is of the flat belt, boot type which is typically constructed of a single piece of flexible, heat resistant, fluid impermeable material such as a rubber-asbestos compound. The ends of the seal member 7 are molded together to form a boot with a longitudinally extending seam 37. In the illustrated structure, the seal member 7 is of a two-ply construction for improved durability. Further, the seal member 7 is without a preformed shape, whereby upon installation in the expansible coupling, it assumes a free-hanging, parabolic or catenary configuration in its relaxed state, which is particularly resistant to fatigue deterioration.

Each of the fasteners 9 includes a bar portion 40 having a first or forward end 41 thereof abutting an upper, central edge 42 of the clamping member 5. The second or rear end 43 of the bar 40 has a leg portion 44 attached to and depending therefrom for engaging a stationary portion of the duct 2. The bar 40 also includes a transverse aperture 45 therethrough disposed between the bar ends 41 and 43 respectively. A fastening device 46 is positioned through the aperture 45 and has a lower end 47 connected with the duct 2 and an upper end 48 engaging the bar 40 and pulling downwardly thereon. In this example, a channel-shaped way 49 is connected with each band 25 at a point rearwardly of the rim 3. Each way 49 comprises a base 50, and opposed and upstanding side walls 51 having inwardly extending flanges 52 thereon. The lower end 47 of the fastening device includes a head 53 having flat opposing faces 54 which slidingly engage the way side walls 51 thereby preventing relative rotation between the way 49 and the fastening device 46. The flanges 52 of the way engage an upper surface of the bolt head 53 thereby slidingly mounting the same within the way such that each fastener can be easily positioned about the periphery of the coupling. In this example, the upper end 48 of the fastening device is threaded, and a nut 55 is engaged therewith for adjustably tightening the rim and clamping members 5 and 3 respectively. Further, the leg 44 of the bar 40 is positioned abuttingly upon the outwardly most side wall 51 of the way such that when the nut 55 is loosened the bar can be easily pivoted and disengaged from the clamping member 5.

In use, a worn flexible seal 7 can be easily and economically replaced. The user first loosens fastener nut 55 and then, without removing the same from the bolt 46, pivots the bar 40 such that the clamping member 3 is free from the inner end 40. Each of the clamping member segments is then detached from the flexible seal 7, which is then in turn removed from the rim 3. The new seal is placed on the rims 3, and the clamping members are positioned thereover and clamped into place by positioning and then tightening each fastener 10.

In structures having fluid moving therethrough under pressure, it is desirable to have the seal member 7 flex outwardly. In such installations, the rim members 3 are inverted to present an outwardly facing channel and the seal 7 has a portion resting therein. The clamp member is also reversed so that the inner surface thereof mates with the channels of the rim members and clamp the seal member therebetween.

It is to be understood that while I have illustrated and described certain forms of my invention, it is not to be limited to the specific forms or arrangement of parts herein described and shown.

What I claim and desire to secure by Letters Patent is:

1. An expansible coupling for sealingly joining first and second duct ends, said coupling comprising:
   a. first and second elongate rim members adapted for attachment to said first and second duct ends respectively, and having an outer surface;
   b. first and second elongate clamping members, each of said clamping members having an inner surface thereof cooperatively mating with the outer surface of said first and second rim members respectively, one of said surfaces of said first rim and clamping members being a channel disposed longitudinally therein and one of said surfaces of said second rim and clamping members being a channel disposed longitudinally therein;
   c. a flexible seal member having a pair of opposing marginal edge portions respectively clamped between the outer and inner surfaces of said first and second rim and clamping members;
   d. means urging said rim and clamping members together;
   e. said first and second rim members have an inverted V-shaped configuration;
   f. said channel in said first and second clamping members is V-shaped;
   g. said urging means comprises a plurality of clamps for positioning intermittently about each of said duct ends, said clamps being divided into first and second sets associated with said first and second duct end respectively;
   h. each of the clamps of said first set includes:
      1. a bar having a first end thereof engaging an outer portion of said first clamping member and a second end thereof being positioned rearwardly of said first clamping member, having a leg portion depending therefrom for engaging said first duct end, and supporting said bar second end in a spaced apart relation with said first duct segment, each of said bars having a transverse aperture therethrough disposed between the first and second ends thereof; and
      2. fastening means positioned through said aperture and having a first end thereof for connection with said first duct end and a second end thereof engaging said bar and pulling inwardly thereon; and
   i. said clamps of said second set being substantially similar to the clamps of said first set.

2. A coupling as set forth in claim 1 including:
   a. a channel-shaped way having opposing side walls and being adapted for connection with each of said duct ends rearwardly of said clamping members; and
   b. said fastening means first end includes a head positioned slidingly within said way; said head having flat opposing faces associated with the side walls of said way which prevent relative rotation between said way and said fastening means.

3. A coupling as set forth in claim 2 wherein:

a. one of said way opposing side walls is positioned rearwardlymost of said rim and clamping members; and
b. said leg portion is positioned abuttingly upon an upper portion of said one side wall.

4. A coupling as set forth in claim 2 wherein:
a. said fastening means second end is threaded and includes a nut engaged therewith for adjustably urging said rim and clamping members together.

5. A coupling as set forth in claim 2 further comprising:
a. a pair of band members each having an outer surface thereof connected with one of said rim members and one of said ways; and wherein
b. each of said band members has an inner surface thereof adapted for connection with one of said duct ends.

6. An expansible joint comprising:
a. first and second duct segments each having an open end and being disposed mutually adjacently, said duct segments each having a lateral shape which is free of sharp corners;
b. first and second elongate rim members attached to the ends of said first and second duct segments respectively and having a inverted V-shaped outer surface;
c. first and second elongate clamping members, each of said clamping members having a V-shaped channel disposed longitudinally therein and cooperatively mating with said first and second rim members respectively;
d. a flexible seal member having a pair of opposing marginal edge portions respectively clamped between said rim and clamping members;
e. means urging said rim and clamping members together;
f. said urging means comprises a plurality of clamps for positioning intermittently about the ends of each of said ducts, said clamps being divided into first and second sets associated with said first and second ducts respectively;
g. each of the clamps of said first set includes:
  1. a bar having a first end thereof engaging an outer portion of said first clamping member and a second end thereof being positioned rearwardly of said first clamping member, having a leg portion depending therefrom and engaging said first duct end, and supporting said bar second end in a spaced apart relation with said first duct segment, each of said bars having a transverse aperture therethrough disposed between the first and second ends thereof; and
  2. fastening means positioned through said aperture and having a first end thereof connected with said first duct and a second end thereof engaging said bar and pulling inwardly thereon;
h. said clamps of said second set each being substantially similar to the clamps of said first set;
i. a channel-shaped way is connected with each of said duct segments adjacent each of said duct open ends; and
j. said fastening means one end includes a head positioned slidingly within said way, said head having flat opposing faces associated with a pair of opposing way side walls which prevent relative rotation between said way and said fastening means.

7. An expansible joint as set forth in claim 6 wherein:
a. said duct ends include a terminal end edge; and
b. each of said clamping members includes an outermost longitudinal edge positioned co-extensively with one of said duct terminal end edges, whereby said seal, in a relaxed state, assumes a substantially catenary configuration.

8. An expansible coupling for sealingly joining first and second ducts at adjacent ends thereof, said coupling comprising:
a. first and second elongate rim members adapted for attachment to said first and second ducts respectively adjacent the ends thereof, and having an outer surface of a V-shaped configuration;
b. first and second elongate segmented clamping members, each of said clamping members having an inner surface of V-shape and cooperatively mating with the outer surface of said first and second rim members respectively, said outer surfaces of said first and second rim members being disposed longitudinally therein with the sides of the V-shapes adjacent the duct end having corresponding slope relative to the respective duct end;
c. a flexible seal member extending around the ducts at the adjacent ends thereof and having opposing marginal side edge portions overlapping said duct ends and respectively clamped between the outer and inner surfaces of said first and second rim and clamping members;
d. means urging said rim and clamping members together to sealingly clamp said seal member side edge portions; and
e. said flexible seal member initially being an elongate transversely flat strip with end portions thereof joined and forming a belt deformed by the respective first and second rim and clamping members at marginal side portions with a portion therebetween extending therefrom at angles corresponding to the slope of the sides of the V-shapes adjacent the ends of the ducts and connected by a transversely arcuate central portion.

9. An expansible joint comprising:
a. first and second duct segments each having an open end and being disposed mutually adjacently, said duct segments each having a lateral shape which is free of sharp corners;
b. first and second elongate rim members attached to the ends of said first and second duct segments respectively and having an inverted V-shaped outer surface;
c. first and second elongate segmented clamping members, each of said clamping members having a V-shaped channel disposed longitudinally therein and cooperatively mating with said first and second rim members respectively;
d. a transversely flat flexible seal member extending around the duct segment ends and having opposing side marginal edge portions respectively overlapping said duct ends between said rim and clamping members; and
e. means urging said rim and clamping members together deforming said side marginal edge portions to correspond to the V-shaped channels and sealingly clamp the seal member thereto with a central portion of the seal member transversely curved from the respective duct ends.

* * * * *